US009621937B1

(12) United States Patent
Carter (10) Patent No.: US 9,621,937 B1
(45) Date of Patent: Apr. 11, 2017

(54) AD SELECTION IN OPT-IN MEDIA EXPERIENCE BASED ON MULTIPLE GROUP MEMBERSHIP AND PARTICIPATION (71) Applicant: BlackArrow, San Jose, CA (US)

(72) Inventor: Leslie M Carter, San Jose, CA (US)

(73) Assignee: BlackArrow, San Jose, CA (US)

(*) Notice: Subject to any disclaimer, the term of this patent is extended or adjusted under 35 U.S.C. 154(b) by 0 days.

(21) Appl. No.: 14/315,227

(22) Filed: Jun. 25, 2014

Related U.S. Application Data (60) Provisional application No. 61/839,368, filed on Jun. 25, 2013.

(51) Int. Cl.
H04N 21/2668 (2011.01)
H04N 21/258 (2011.01)
H04N 21/81 (2011.01)

(52) U.S. Cl.
CPC ... *H04N 21/2668* (2013.01); *H04N 21/25883* (2013.01); *H04N 21/812* (2013.01)

(58) Field of Classification Search
CPC ............................ H04N 21/2547; H04N 9/79
See application file for complete search history.

(56) References Cited

U.S. PATENT DOCUMENTS

| | | | |
|---|---|---|---|
| 8,060,904 B1* | 11/2011 | Evans et al. | 725/35 |
| 8,234,158 B1* | 7/2012 | Sun et al. | 705/14.49 |
| 2006/0287915 A1* | 12/2006 | Boulet et al. | 705/14 |
| 2007/0283403 A1* | 12/2007 | Eklund et al. | 725/117 |
| 2008/0195468 A1* | 8/2008 | Malik | G06Q 30/02 705/14.53 |
| 2008/0201326 A1* | 8/2008 | Cotter et al. | 707/5 |
| 2009/0199230 A1* | 8/2009 | Kumar et al. | 725/32 |
| 2010/0042517 A1* | 2/2010 | Paintin et al. | 705/30 |
| 2011/0131613 A1* | 6/2011 | Cilli et al. | 725/62 |
| 2012/0303573 A1* | 11/2012 | Pan et al. | 706/52 |
| 2013/0239132 A1* | 9/2013 | Rakoff et al. | 725/13 |
| 2014/0237082 A1* | 8/2014 | Chen et al. | 709/219 |

* cited by examiner

*Primary Examiner* — Chenea Smith
(74) *Attorney, Agent, or Firm* — FSP LLC (57) ABSTRACT A system to delivery media over a network for rendering by client devices forms a definition of a group of people who have opted-in to experience a defined shared media experience, and augments the shared media as a result of a dynamic measurement of one or more characteristics of the group.

18 Claims, 7 Drawing Sheets

AD SELECTION IN OPT-IN MEDIA EXPERIENCE BASED ON MULTIPLE GROUP MEMBERSHIP AND PARTICIPATION

CROSS-REFERENCE TO RELATED APPLICATIONS

This application claims benefit under 35 u.s.c. 119 to U.S. application Ser. No. 61/839,368, filed on Jun. 25, 2013, and incorporated herein by reference in its entirety.

BACKGROUND OF THE INVENTION

Technologies such as modern cable television infrastructure, broadband, and high speed cellular phone networks have made it easier than ever to consume media on demand and from wherever the consumer happens to be, through whatever device is most appropriate or convenient. Media is also becoming increasingly interactive, driven initially with technologies used on the web and now making its way into television-experienced media. At the same time the same technologies have been widely embraced as a way for families and friends all over the globe to reconnect and keep in touch in an increasingly accessible format. Social networking has seen the online rise of special interest groups, clubs, and other forms of association between people that may have not ordinarily been able to connect. The increased adoption of social networking and social media has also opened up new possibilities on how people can consume media. In the past the only shared media experiences were typically those provided by linear television, radio and movie theatres where groups of people all experienced the same media at the same time. Prior techniques allow individuals to record television or radio media for the purpose of consuming the media at a later time, using devices like digital video recorders (DVRs). Each consumer experiences the same media but at different times depending on when each of the consumers decides to experience (e.g., play) the media.

BRIEF SUMMARY OF THE INVENTION

A system to delivery media over a network for rendering by client devices includes logic to form a definition of a group of people who have opted-in to experience a defined shared media experience; and logic to augment the shared media as a result of a dynamic measurement of one or more characteristics of the group.

The system may augment the shared media with supplemental media to be experienced simultaneously with the shared media. The system may select one of many alternate narratives for the shared media. The system may augment the shared media by expanding it to include additional media feeds not limited to the device or platform which instantiated the shared media experience for a particular member of the group. The system may commence communication of the shared media to members of the group upon the passing of a participation threshold (quorum).

The system may augment the shared media according to a growth rate of membership in the group. The system may change a quantity, type, or arrangement of advertising based on the growth rate. The system may change a quantity, type, or arrangement of advertising based on a rate at which members are leaving the group. The system may change a quantity, type, or arrangement of advertising based on a rate at which fees are collected from members of the group.

The system may change the number of ad insertion points or location of ad insertion points based on the one or more characteristics of the group. The system may age out a member of the group and to substitute aggregate data about the member for discrete data upon aging out the member. The system may age out a member of the group and to substitute an abstract identifier representing participation of the member in multiple shared media experiences. The system may store, for a member that has subscribed to multiple groups, an aggregate abstract identifier uniquely representing membership in the multiple groups. The system may augment the shared media with ads selected based on attributes of group, different from attributes of a group of actual viewers of the shared media. The system may augment the media with ads selected based on attributes derived by combining attributes of the group and attributes of actual viewers of the shared media.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION OF THE INVENTION

Glossary

"ad campaign manager" in this context refers to a logic component in SCTE 130 compliant advanced digital advertising systems, that provides the information necessary for the ADS to render ad decisions. An ADS may provide the same decision services or different services to multiple ADM simultaneously. the Placement Execution cloud and/or the ADM block may consult the POIS for placement opportunity information with the POIS fronting the Inventory System cloud.

"ad content" in this context refers to content promoting or raising awareness of a product or service, displayed in conjunction with program content, but which typically is independent of the program content (can be displayed in conjunction with different program content at different times).

"ad placement" in this context refers to a decision resulting from an ad placement opportunity which may include a content binding and a set of constraints. Ad content inserted into or along-side program content.

"client device" in this context refers to any machine that interfaces to a machine network to obtain resources from one or more server systems.

"program content" in this context refers to content to which advertising is applied. Digital bit streams (e.g., MPEG) encoding television programs or movies are examples of program content.

"stream" in this context refers to content communicated over a network as a sequence of continuous parts (e.g., packets, bits, bytes) and rendered as the content is received at the recipient device.

DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively.

Additionally, the words "herein," "above," "below" and words of similar import, when used in this application, refer to this application as a whole and not to any particular portions of this application. References to "or" among elements indicates one or more of the elements, unless the context indicates otherwise.

"Logic" refers to machine memory circuits, machine readable media, and/or circuitry which by way of its material and/or material-energy configuration comprises control and/or procedural signals, and/or settings and values, that may be applied to influence the operation of a device. Magnetic media, electronic circuits, electrical and optical memory (both volatile and nonvolatile), and firmware are examples of logic.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic may vary according to implementation.

The following description uses text messages by way of example. Those skilled in the art will recognize that the described techniques may be applied to email systems and email-text communication without undue experimentation.

A DVS 130 compliant system may include various logic components. One such component is the ADS ad decision (i.e., ad selection) component. ADS components define rules and implement functions to select ads to be combined with program content and to define how the ads and program content are combined. Decisions may be specific (e.g., specific to a date and time) or they may be made based on a set of conditions and parameters (e.g., geographic zones and subscriber profile information). Another type of logic component is an ADM ad management component. ADM components define rules and implement functions to coordinate the insertion of advertising media into other content (e.g., programs). According to DVS 130, ADS components register to cooperate with one or more ADM components. The ADS components select ads and specify how to combine them with other content, and the ADM components control the actual combining of the ads with the other content. Another type of logic component is a CIS content information component. CIS components define rules and implement functions to identify and manage descriptive data (metadata) for content (e.g., programs) and advertising. The CIS components provide search, discovery, and availability alerts for content and the ads to combine with the content. Another type of logic component is the POTS placement opportunity information component. POTS components define rules and implement functions to identify and describe ad placement opportunities. The POTS defines which platforms are available for particular ad media, ownership rights associated with ad placement opportunities, and ad placement policies. Ad placement opportunities are specific to specific content and may also be specific to the communication network for the content, the geographic location(s) where the content is distributed, and many other factors. Another type of component is the SIS subscriber information component. SIS components define rules and implement functions to store, process, and access subscriber information to apply to the ad selection process. The SIS may be employed for selection and placement of ads based on subscriber media consumption behavior. The SIS stores and controls access to personal information of media consumers (e.g., cable television subscribers). Thus conventional SIS components control and limit access to the information they store in order to provide for the privacy of media consumer's personal data.

One or more ADS component may register with one or more CIS component to search for content and receive alerts when specific types of content are available for placing ads. One or more POTS components may be engaged by other components to identify when advertising content is available. One or more SIS components may be engaged by other components to obtain information related to subscriber activities (preferences or viewing habits).

In some systems a hub component coordinates communication between all of the system components. The hub may be stateless relative to the other components, or it may maintain an internal state independent of the state of the other components.

A new system is described to create or modify ad maps reacts to subscriber group micropayments. The system may operate in compliance with DVS 130 specifications. A group of people who have opted into (subscribed to) a future or ongoing media even can cause modification of the ad maps the system applies, based on factors described herein. Group behavior can cause the ad map for the content to be modified with fewer or shorter ads; or ads of a certain type or category. Generally, the group behavior can influence the number or flavor of the ads they are exposed to. The group can influence selection of the supplemental media, length or number of selections of supplemental media, or arrangement or sequence of the supplemental media the group is exposed to during presentation of the subscribed-to media event.

In the following drawings, various logic components may be implemented as part of a hub, a POTS, an ADM, and ADS, and cooperative combinations of these components. For example, an 'opt-in' component mapping subscribers to particular content and tracking trends in the group may be implemented by or interoperate with a hub. Likewise, a hub may interact with or implement a POTS logic component in order to carry out modifications to ad maps.

The system provides a means in which a media experience shared amongst a group of people, who have opted-in to be defined as part of a the group, can be augmented or modified. The augmentation or modification to the shared media experience can be as a result of a dynamic measurement of one or more characteristics of the group potentially combined with the context of the media and viewing experience. The new shared media experience can involve the addition of supplemental media to be experienced simultaneously with the original shared media experience, or provide the selection of one of many alternate narratives for the shared media experience, including changing original shared media experience itself or inserting additional media such as advertising or information. The augmentation or modification of the shared media experience can be expanded to include additional media feeds not limited to the device or platform which instantiated the original shared media experience for a given user.

For the purpose of providing examples within detailed description "media" may refer to audio/video content, static graphic and interactive content, but the invention should not be considered limited to these forms of media.

The term "consumer" may refer to a person, machine or process which is capable of receiving media. For the purpose of providing examples within the detailed description consumer may refer to a person watching, listening or interacting with media, but the invention should not be considered limited to people.

The term "shared media experience" may refer to any consumption of media amongst a group of participants. For the purpose of the present invention, media consumers must have identified themselves as being a member of the group.

The term "consumer generated event" may refer to an event created by a consumer during a shared media event. This could be for example the consumer interacting with the media, pausing the shared media experience, making a selection to a prompt or question or other similar events that those skilled in the art to practice the invention would be able to utilize in other embodiments.

The term "media generated event" may refer to an event created by the media being consumed during a shared media event. This could be in-band media signaling, out of band associated media metadata or some other form.

The term "participation threshold" may refer to a predefined number of consumers that are participating with a particular instance of shared media experience.

The term "event threshold" may refer to a predefined number of consumer generated events.

The term "shared media group" may refer to a group of consumers that have purposely opted in be part of a collective (group) for the purpose of having shared media experiences.

Disclosed herein is a method and system for dynamically introducing new shared media to a group of media consumers participating in a shared media experience. The system defines how a shared media experience can be changed based on characteristics and events related to the group generated prior and during the group media experience, and by group dynamics prior to or during the presentation of the shared media event.

The commencement of the shared media experience may be based on but not limited to such factors as an agreed upon start date and time, the passing of a participation threshold (quorum), or an event or notification generated by the entity that is responsible for delivering the shared media experience. Only consumers that are part of the shared media group will be able to participate in a specific instance of a shared media experience.

The growth rate of the group, e.g. how fast people are joining, is a factor that may affect how the (original or supplemental) media is presented. A quantity, type, and/or arrangement of advertising or other supplemental media may be dependent on dynamics of the group evolution/growth as well as characteristics of the group or its members, not limited to but including:

The number of members actively participating in a shared media experience or who have registered to become part of the shared media experience The number of members in the group The rate at which members are joining or leaving the group The rate at which members are joining or leaving the shared media experience How many fees have been collected or pledged if there's a fee associated with joining the group or shared media experience The rate at which feeds may be collected or pledge The aggregate or average demographic, psychographic, geographic or behavioral characteristics of the group, those actively participating in a shared media experience, or have submitted fees or pledges Such characteristics could affect the type of ads, the length of ads, the placement of ads, or the number of ad insertion points (breaks) within the shared media experience. For example more fees paid towards a shared media experience may cut the number of breaks down or eliminate them completely if past a certain threshold. The number of ad insertions points may remain the same and the number of ads within each break may vary depending on these characteristics, or a combination of both ad insertion points and amount of ads could vary. This process need not be limited to reducing ad payloads, and additional ads could be added based on these characteristics also.

The membership to a group participating in a shared media experience may be reduced or members aged out due to many reasons including but not limited to a certain period of active or inactive membership, the number of shared media experiences participated, the rate of shared media participation, the activity of the group as a whole.

At such time, data about a particular member, their characteristics, their memberships to groups and activity in shared media experiences may be reduced or eliminated. Aggregate data may be collected and substituted instead where discrete data points may have existed. For example the data that pertains to them having participated in shared media experience x, y and z may be purged and replaced with a count saying they participated in 3 shared media experiences, or some abstract identifier used to represent what it means to have participated in those three shared media experiences and that abstract identifier would be associated with the member. The abstract identifier may also be aged out due to some condition.

If a member has subscribed to multiple groups, rather than store the individual group memberships the member may be noted as being part of those groups through some aggregate abstract identifier. For example, if someone had subscribed to judo and karate groups theses values may be abstracted to martial arts. Or the two groups could have been abstracted to some value which has no meaning outside of the context of the group definer, for example the value of A1234 could also represent that they are part of judo and karate groups without identifying this group membership to parties other than the group definer.

The shared media experience can be affected by the dynamics of the group membership and those participating or registered to participate with the shared media experience. For example, if enough members watching the shared media experience are associated with a particular sporting team, and the shared media experience was a fictional story about the same sport then the narrative may change to include references to the sporting team. Or if the amount of fees collected has met some condition then the shared media experience may be allowed to continue, or if the fees haven't been collected then the shared media experience may be halted until such time that the fees have been collected or some other condition has been met. For example participants of a shared media experience may be allowed to see not just the current episode of a program but may also get to see the following episode immediately afterwards if fees had been met.

Ad selection for a media experience is influenced by attributes of an opt-in group, which may not be and is typically different from attributes of a group of actual viewers. In one implementation, ads (or other media to supplement the primary media that is opted-into) are selected based on attributes derived by combining attributes of an opt-in group and attributes of actual viewers.

Multiple opt-in groups can be applied against the same upcoming media event; the viewer's experience of advertising, alternate endings, or other supplemental content is different depending on which group (or groups) they are opted into, and optionally also who is actually viewing the media along with them at that time (the "actual viewership"). "Actual viewership" may be a function of the actual participants in the media experience, a participation rate of those who opted-in, or statistics that compare opt-in rates against actual participation rates for the group as a whole or subgroups of the group. In one model where privacy is an important consideration, group attributes are ascertained, then the ads are selected based on group attributes and optionally the number of people from the group watching, or statistical qualities of the viewing group; actual details about who particularly is watching, or who particularly opted-into the experience, are obfuscated. In one implementation, NVPs in the CIS/SIS form groups; subscriber can be associated with multiple groups in the SIS; the CIS defines the media event and an association of one or more opt-in groups to the media event.

The group association information, and actual participation information, may be relevant to future ad selection for future media events; if a person opts in to groups often, but doesn't participate often, that may determine ad selection for media they opt into in the future (their relevance for ad selection may be reduced or increased based on participation).

The techniques and procedures described herein may be implemented via logic distributed in one or more computing devices. The particular distribution and choice of logic may vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

DRAWINGS

Figure 1:
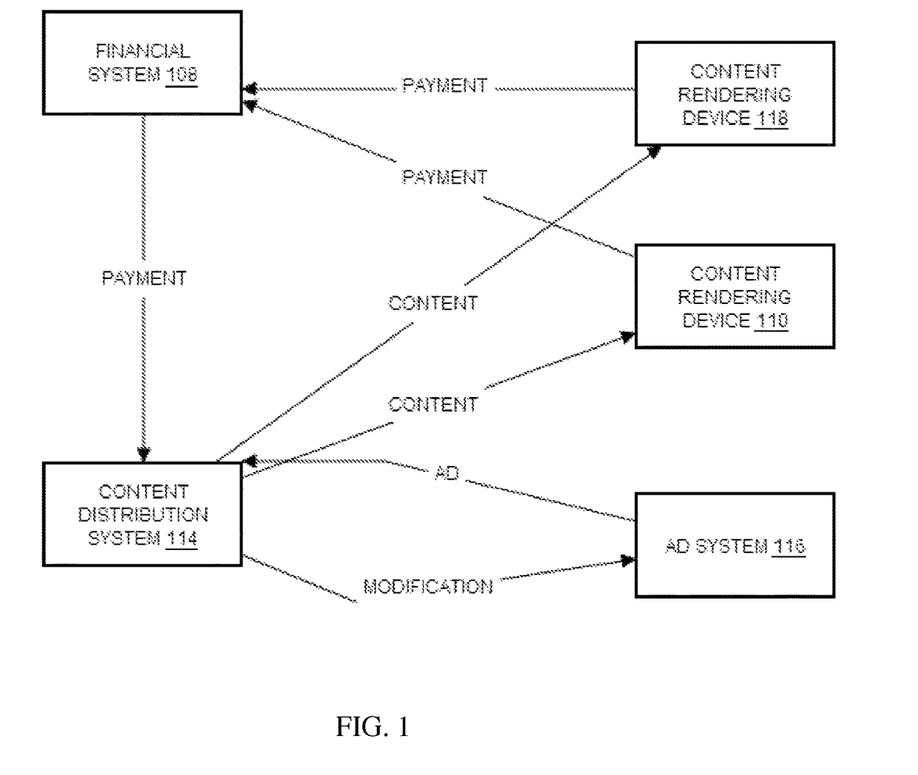
FIG. 1 illustrates an embodiment of a content delivery system.
Figure 2:
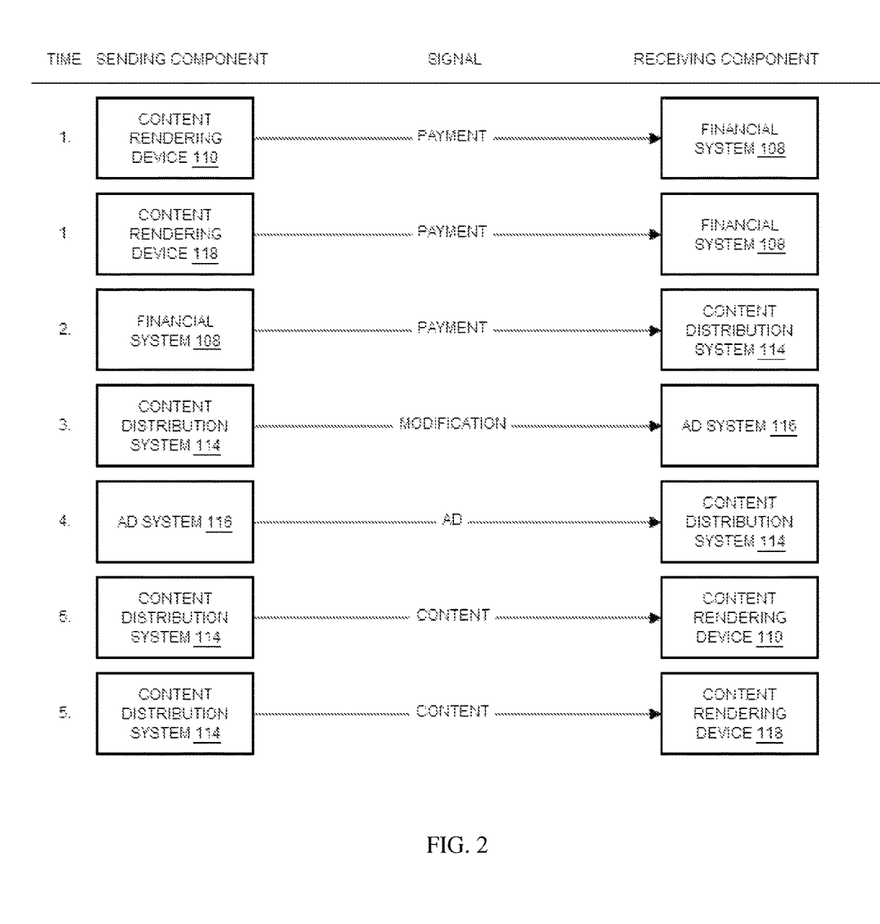
FIG. 2 illustrates an embodiment of a content delivery process.
Figure 3:
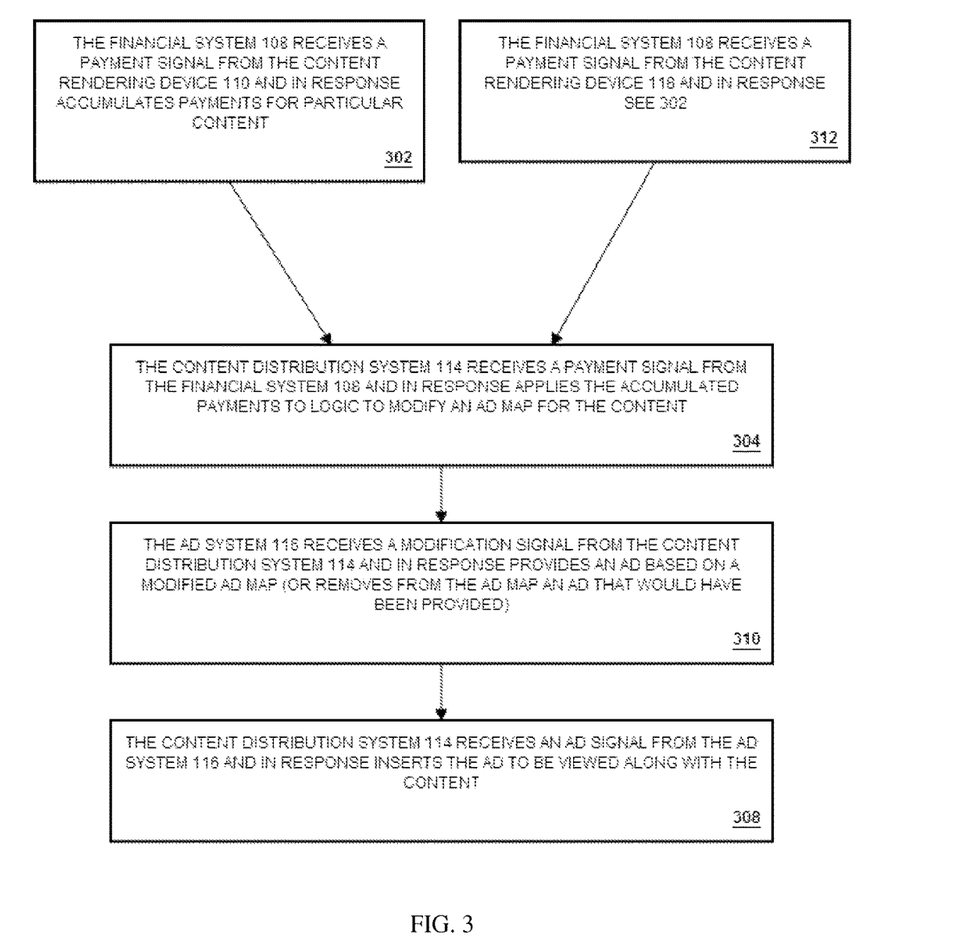
FIG. 3 illustrates an embodiment of a content delivery process.
Figure 4:
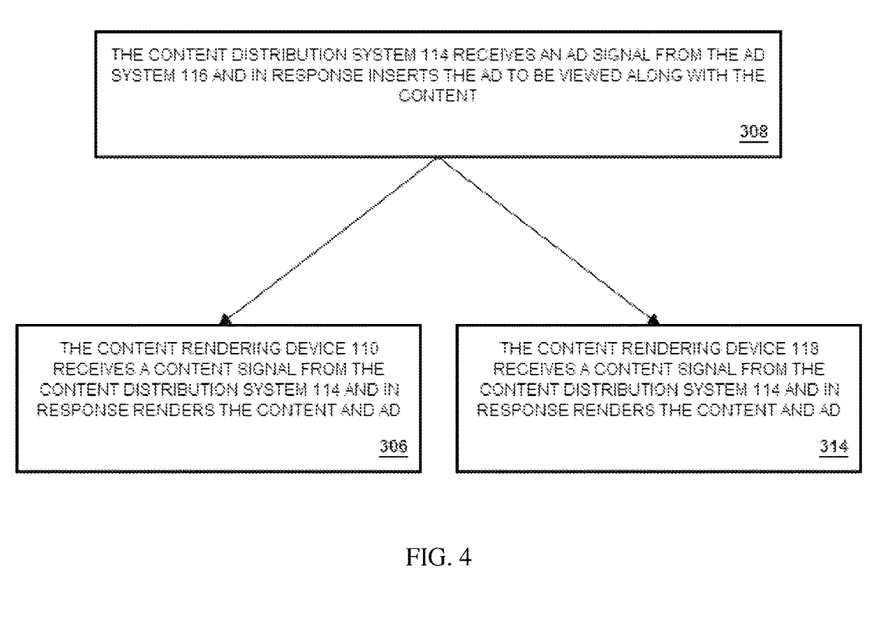
FIG. 4 illustrates an embodiment of a content delivery process.

FIG. 1 is a system diagram of an embodiment of a content delivery system. FIG. 2 is an action flow diagram of an embodiment of a content delivery process. FIG. 3-4 is a flow chart of an embodiment of a content delivery process. Collectively these drawings illustrate a system and process to modify ad maps based on multiple financial transactions (e.g., microtransactions) from multiple different viewers (e.g., using mobile phone payment apps).

The system comprises financial system 108, content rendering device 110, content distribution system 114, ad system 116, and content rendering device 118. The financial system 108 receives a payment signal from the content rendering devices 110,118 and in response accumulates payments for particular content (302, 312). The content distribution system 114 receives a payment signal from the financial system 108 and in response applies the accumulated payments to logic to modify an ad map for the content (304). The ad system 116 receives a modification signal from the content distribution system 114 and in response provides an ad based on a modified ad map (or removes from the ad map an ad that would have been provided) (310). The content distribution system 114 receives an ad signal from the ad system 116 and in response inserts the ad to be viewed along with the content (308). The content rendering devices 110 receive content from the content distribution system 114 and in response render the content (306, 314).

Thus multiple viewers interact with the content distribution system 114 to opt-in to an ongoing or future media experience (i.e., a communication of media information over a distribution network to a display/rendering device). The content distribution system 114 will generate ad maps for the media experience based on characteristics of the opt-in group, possibly enhanced or changed based on actual participation by members of the group. creating and executing a shared media experience. A media experience is defined and published to an interface accessible to network-connected devices. Devices (e.g., portable computers, smart phones, set top boxes, or smart televisions) access the network-connected interface and obtain information about the media experience, which is processed by the devices into display attributes on the device for a user of the device to observe. Some of the device users operate the device controls to cause signaling to logic that manages the media experience, the signaling indicating that the users want to join the media experience. A certain number of users may join over a period of time, which may span several days or longer. Shared media is determined to present concurrently with the media experience, where the determination evolves along with characteristics of those who have joined the media event, as well as potentially other factors such as described herein. Eventually, a sufficient number of users have joined, or a certain date/time or event transpires, and the media experience is initiated. The media experience is presented to one or more users who have joined (they may experience the media simultaneously, as in a broadcast, or at different times, as in video-on-demand). The shared media that is presented along with the media experience may vary during the media experience, based on who is actually experiencing the media, and other factors as described herein.

The membership subsystem of devices may comprise a CIS (Content Information Service, see SCTE 130) and a SIS (Subscriber Information Service). The SIS may store, for each person who opts into the shared future experience (or potential experience, if there is a participation threshold before which the media will not be streamed), identifiers of the shared content as defined in the CIS. In this manner participation levels and subgroup demographics for the future media experience may be tracked/tabulated.

The content distribution system 114 will generate ad mapsfor the media experience based on characteristics of the opt-in group, possibly enhanced or changed based on actual participation by members of the group. The growth rate of the group, e.g. how fast people are joining, is a factor that may affect ad maps defining how supplemental media is presented. Advertising content could be inserted as part of the overall shared media experience. The quantity and type of advertising may be dependent on characteristics of the group or its members, not limited to but including:

The number of members actively participating in a shared media experience or who have registered to become part of the shared media experience The number of members in the group The rate at which members are joining or leaving the group The rate at which members are joining or leaving the shared media experience How many fees have been collected or pledged if there's a fee associated with joining the group or shared media experience The rate at which feeds may be collected or pledge The aggregate or average demographic, psychographic, geographic or behavioral characteristics of the group, those actively participating in a shared media experience, or have submitted fees or pledges A particular viewer may act to debit a micro-transaction (i.e., a transaction of less than $5) to the account to influence the ad map generation system for the media they have opted into. A sufficient accumulation of micro-transactions to the benefit of a party owning/distribution or otherwise having financial or advertising rights in the media, may influence the ad map generation to insert certain types of ads (e.g., for certain products or services), to shorten the ads or lower their frequency of insertion, or to move the ads from midroll to endroll.

Figure 5:
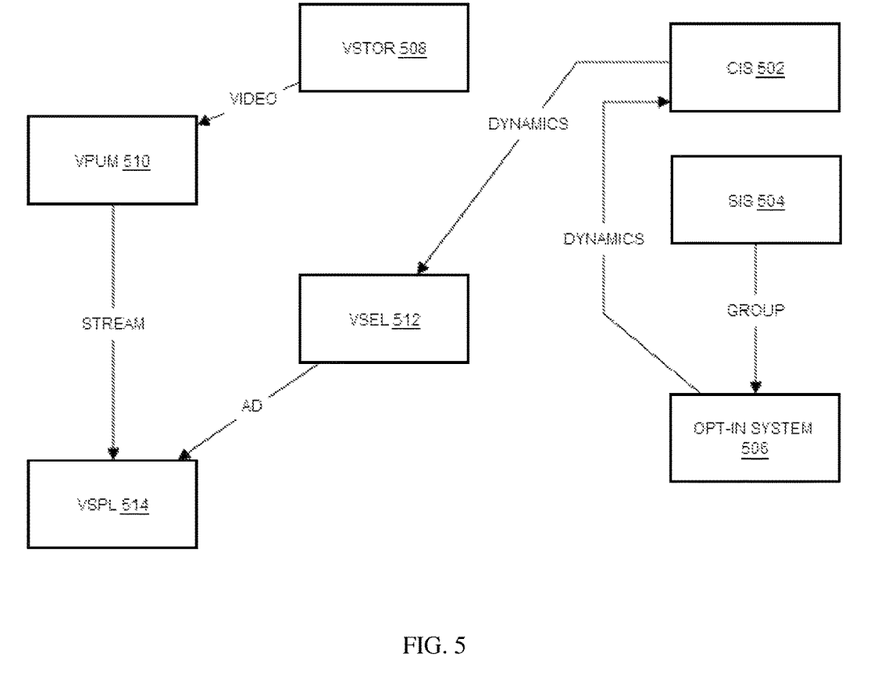
FIG. 5 is a system diagram of an embodiment of a content distribution system.
Figure 6:
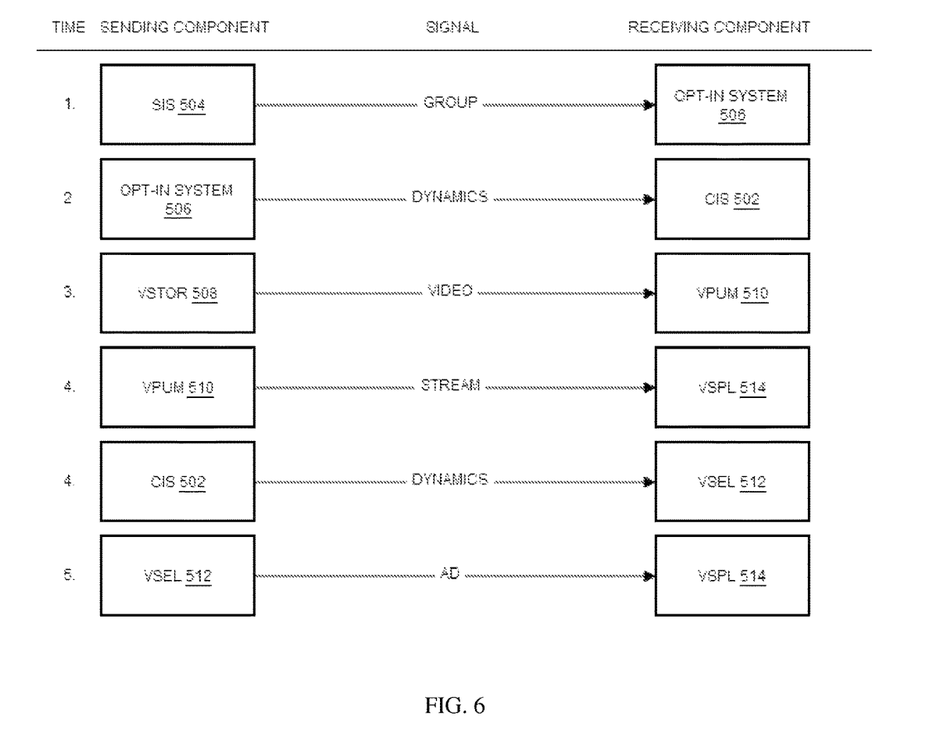
FIG. 6 is an action flow diagram of an embodiment of a content distribution process.
Figure 7:
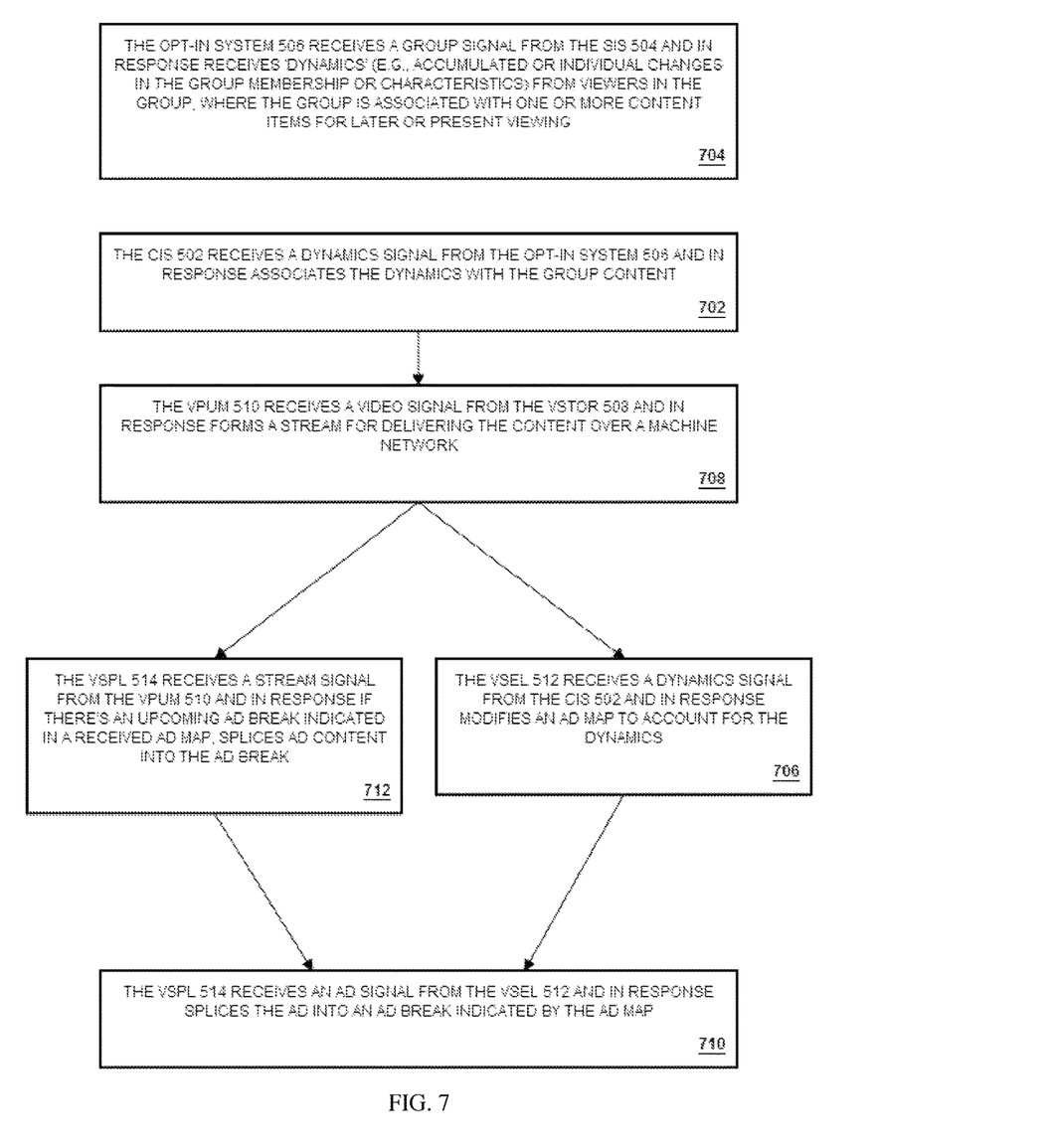
FIG. 7 is a flow chart of an embodiment of a content distribution process.

FIG. 5 is a diagram of an embodiment of a content distribution system. FIG. 6 is an action flow diagram of an embodiment of a content distribution process. FIG. 7 is a flow chart of an embodiment of a content distribution process. The system comprises CIS 502, SIS 504, Opt-In System 506, Vstor 508, Vpum 510, Vsel 512, and Vspl 514. Collectively these drawings illustrate a system and process for video delivery and advertising (although the invention is not necessarily limited to video content delivery).

The Opt-In System 506 (e.g., a web site) receives a group signal from the SIS 504 and in response receives 'dynamics' (e.g., changes in group membership or characteristics) for viewers in the group, where the group is associated with one or more content items for later or present viewing (704). The CIS 502 receives a dynamics signal from the Opt-In System 506 and in response associates the dynamics with the group content (702). The Vpum 510 (video pump) receives a video signal from the Vstor 508 (video storage system) and in response forms a stream for delivering the content over a machine network (708). The Vspl 514 (video splicer) receives a stream signal from the Vpum 510 and in response if there's an upcoming ad break indicated in a received ad map, splices ad content into the ad break (712). The Vsel 512 (video selector) receives dynamics from the CIS 502 and in response modifies an ad map to account for the dynamics (706). The Vspl 514 receives an ad signal from the Vsel 512 and in response splices the ad into the content (710).

What is claimed is:

1. A system to deliver media over a network for rendering by client devices, the system comprising:
   at least one memory that stores computer-executable instructions; and
   at least one hardware processor that, when executing the computer-executable instructions stored in the at least one memory, is configured to:
   form a definition of a group of people who have opted-in to experience a defined shared media experience;
   augment the defined shared media experience with supplemental media selected based on a dynamic measurement of aggregate of personal attributes of individuals of the group of people, the supplemental media including advertisements;
   digitally splice the advertisements into the defined shared media experience;
   change a number of ad insertion points for the defined shared media experience or locations of ad insertion points for the defined shared media experience based on the aggregate of personal attributes of individuals of the group of people; and
   dynamically change the digital splicing of the advertisements into the defined shared media experience in quantity, type, or arrangement of the advertisements augmenting the defined shared media experience based on a rate at which fees associated with joining the group or the defined shared media experience are collected from the group of people.

2. The system of claim 1, wherein the at least one hardware processor, when executing the computer-executable instructions stored in the at least one memory, is further configured to:
   supplement the defined shared media experience with the supplemental media to be experienced simultaneously with the defined shared media experience.

3. The system of claim 1, wherein the at least one hardware processor, when executing the computer-executable instructions stored in the at least one memory, is further configured to:
   select from a plurality of alternate narratives for the defined shared media experience based on the dynamic measurement of the aggregate of personal attributes of individuals of the group of people.

4. The system of claim 1, wherein the at least one hardware processor, when executing the computer-executable instructions stored in the at least one memory, is further configured to:
   expand the defined shared media experience to include additional media feeds not limited to a device or a platform that instantiated the defined shared media experience for a particular member of the group of people.

5. The system of claim 1, wherein the at least one hardware processor, when executing the computer-executable instructions stored in the at least one memory, is further configured to:
   a media distributor to commence communication of the defined shared media experience to members of the group of people only upon the triggering of a defined membership threshold (quorum).

6. The system of claim 1, wherein the at least one hardware processor, when executing the computer-executable instructions stored in the at least one memory, is further configured to:
   enhance the defined shared media experience according to a growth rate of membership in the group of people.

7. The system of claim 6, wherein the at least one hardware processor, when executing the computer-executable instructions stored in the at least one memory, is further configured to:
   change the quantity, type, or arrangement of the advertising augmenting the defined shared media experience based on the growth rate.

8. The system of claim 7, wherein the at least one hardware processor, when executing the computer-executable instructions stored in the at least one memory, is further configured to:
   change the quantity, type, or arrangement of the advertising augmenting the defined shared media experience based on a rate at which members are leaving the group of people.

9. The system of claim 1, wherein the at least one hardware processor, when executing the computer-executable instructions stored in the at least one memory, is further configured to:
   age out members of the group of people and substitute for discrete participations of the members of the group of people aggregate data characterizing the participation of the members of the group of people that were aged out.

10. The system of claim 1, wherein the at least one hardware processor, when executing the computer-executable instructions stored in the at least one memory, is further configured to:
    age out a member of the group of people and substitute for discrete participations of the member of the group of people an abstract identifier representing participation of the member of the group of people in multiple shared media experiences including the defined shared media experience.

11. The system of claim 1, wherein the at least one hardware processor, when executing the computer-executable instructions stored in the at least one memory, is further configured to:
    store for a member of the group of people that has subscribed to a plurality of different defined shared media experiences, an aggregate abstract identifier uniquely representing membership of the member of the group of people in the plurality of different defined shared media experiences, the aggregate abstract identifier not particularly identifying any one of the plurality of different defined shared media experiences.

12. The system of claim 1, wherein the at least one hardware processor, when executing the computer-executable instructions stored in the at least one memory, is further configured to:
  enhance the defined shared media experience with the advertising augmenting the defined shared media experience selected based on attributes of the group of people, the attributes of the group of people different from attributes of a group of actual viewers of the defined shared media experience.

13. The system of claim 1, wherein the at least one hardware processor, when executing the computer-executable instructions stored in the at least one memory, is further configured to:
  enhance the defined shared media experience with the advertising augmenting the defined shared media experience selected based on attributes derived by combining attributes of the group of people and attributes of a group of actual viewers of the defined shared media experience.

14. A system to deliver media over a network for rendering by client devices, the system comprising:
  at least one memory that stores computer-executable instructions; and
  at least one hardware processor that, when executing the computer-executable instructions stored in the at least one memory, is configured to:
    form a definition of a group of people who have opted-in to experience a defined shared media experience;
    supplement the defined shared media experience with supplemental media including advertising selected based on a dynamic measurement of aggregate of personal attributes of individuals of the group of people;
    digitally splice the advertisements into the defined shared media experience;
    change a number of ad insertion points for the defined shared media experience or locations of ad insertion points for the defined shared media experience into which to digitally splice the advertisements, based on the aggregate of personal attributes of individuals of the group of people; and
    age out members of the group of people and substitute for discrete participations of the members of the group of people aggregate data characterizing the participation of the members of the group of people that were aged out.

15. The system of claim 14, wherein the at least one hardware processor, when executing the computer-executable instructions stored in the at least one memory, is further configured to:
  supplement the defined shared media experience with the supplemental media to be experienced simultaneously with the defined shared media experience.

16. The system of claim 14, wherein the at least one hardware processor, when executing the computer-executable instructions stored in the at least one memory, is further configured to:
  select from a plurality of alternate narratives for the defined shared media experience based on the dynamic measurement of the aggregate of personal attributes of individuals of the group of people.

17. The system of claim 14, wherein the at least one hardware processor, when executing the computer-executable instructions stored in the at least one memory, is further configured to:
  expand the defined shared media experience to include additional media feeds not limited to a device or a platform that instantiated the defined shared media experience for a particular member of the group of people.

18. The system of claim 14, wherein the at least one hardware processor, when executing the computer-executable instructions stored in the at least one memory, is further configured to:
  commence communication of the defined shared media experience to the members of the group of people only upon the triggering of a defined membership threshold (quorum).

* * * * *